A. PFAU.
HYDRAULIC POWER INSTALLATION.
APPLICATION FILED MAY 14, 1917.

1,283,288.

Patented Oct. 29, 1918.

Inventor
A. Pfau
by
Attorney

UNITED STATES PATENT OFFICE.

ARNOLD PFAU, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

HYDRAULIC-POWER INSTALLATION.

1,283,288.        Specification of Letters Patent.        Patented Oct. 29, 1918.

Application filed May 14, 1917. Serial No. 169,124.

*To all whom it may concern:*

Be it known that I, ARNOLD PFAU, a citizen of the Republic of Switzerland, residing at Milwaukee, in the county of Milwaukee and State of Wisconsin, have invented a certain new and useful Improvement in Hydraulic-Power Installations, of which the following is a specification.

This invention relates to improvements in the construction of hydraulic power installations.

An object of the invention is to provide a hydraulic power installation which is simple and compact in construction and highly efficient in operation. One of the more specific objects is to provide an arrangement of hydraulic energy-translating devices or turbines which will reduce to a minimum the power house space required for an installation of maximum capacity. A further object is to provide an arrangement of hydraulic turbines which may be readily constructed and which will permit utilization of a single governor for controlling a plurality of independent turbines. Still another object is to provide a common inlet flume for delivering motive fluid to two oppositely rotatable turbines having noncoincident central planes perpendicular to their axes of rotation.

A clear conception of an embodiment of the invention may be had by referring to the drawing accompanying and forming a part of this specification in which like characters designate the same or similar parts in the various views.

Figure 1:
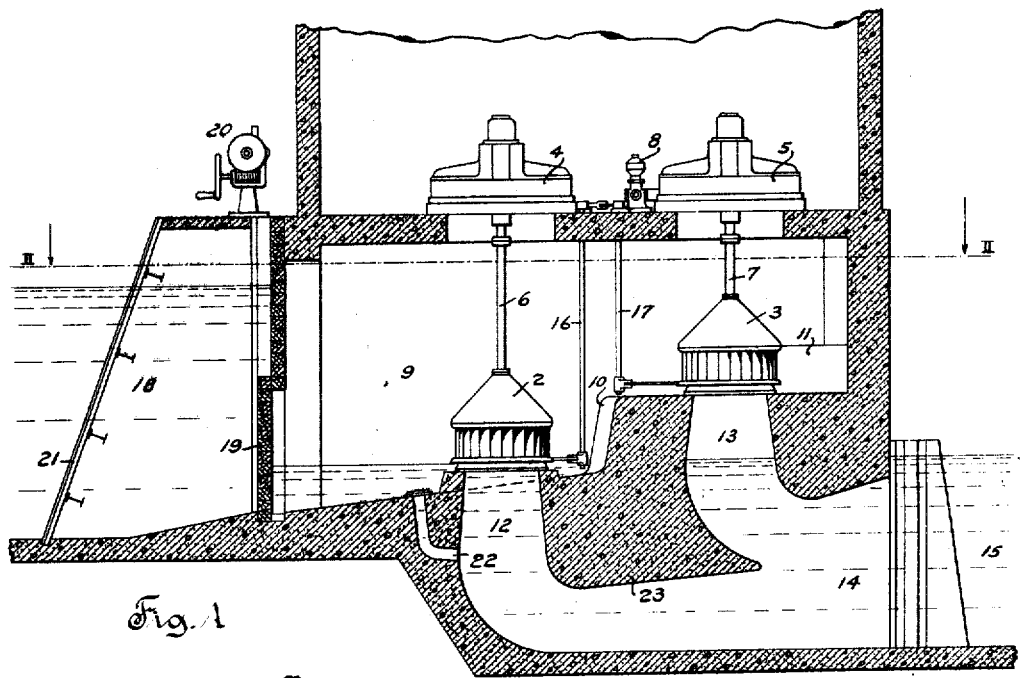
Figure 1 is a fragmentary vertical section through the power house of a hydraulic turbine installation.
Figure 2:
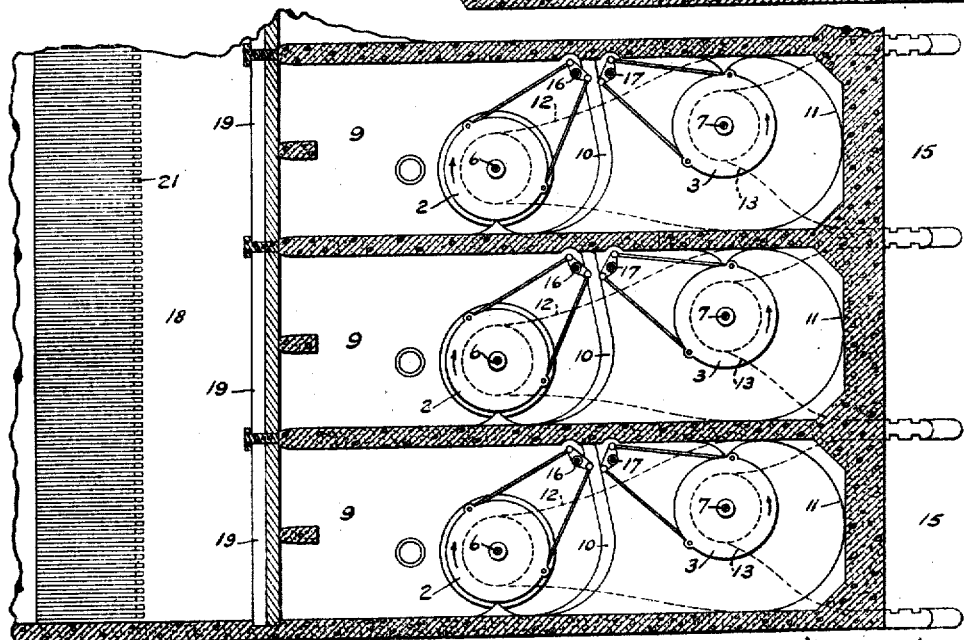
Fig. 2 is a fragmentary horizontal section through the power house of a hydraulic turbine installation, the section being taken along the line II—II of Fig. 1 looking in the direction of the arrows.

While the invention has been disclosed as applied in a turbine installation comprising a plurality of vertical hydraulic turbines of the Francis type, it should be understood that the invention is also applicable to other types of turbines and is not limited to installations in which the units are vertically disposed. The invention is, moreover, not necessarily limited to installations in which single runner turbines are employed.

In the drawing, the power house 23 is provided with a series of parallel inlet flumes 9 of the open type, which are communicable with a common penstock 18 through gates 19. The usual gate-opening mechanisms 20 and grids 21 for preventing the entrance of undesirable foreign material to the turbines, are provided. Within each of the inlet flumes 9 is located a pair of single vertical Francis turbines 2, 3. Each of the upstream turbines 2 is rotatable about a vertical shaft 6 and is located at a lower level than the corresponding downstream turbine 3 which is rotatable about a vertical shaft 7. The location of these turbines 2, 3 is such that their central planes perpendicular to the shafts 6, 7 are non-coincident, whereby a direct and unobstructed flow to each turbine results. The turbines 2, 3 are oppositely rotatable, the water being guided into the turbine 2 by means of a wall 10, and into the turbine 3 by means of a wall 11. The walls 10, 11 are formed to properly direct the water into the turbines and in effect produce spiral intake casings for the respective turbines 2, 3.

The turbines 2, 3 communicate with vertically disposed discharge draft tubes 12, 13 which are of substantially equal vertical lengths and of substantially like construction throughout. A drain pipe 22 forming a means of communication between one of the draft tubes 12 and the corresponding intake flume 9, serves to drain the intake flume 9 when the corresponding gate 19 is closed. The draft tubes 12, 13 communicate with a common discharge flume 14 which communicates directly with a common tail race 15. The formation of the draft tubes 12, 13 and their connection with the discharge flume 14 is such that minimum interference of the streams discharged from the two draft tubes, results.

The turbine 2 is direct connected by means of its shaft 6 to an electric generator 4, while the turbine 3 is direct connected by means of its shaft 7 to an electric generator 5. The gate mechanism of the turbine 2 is controlled by means of a regulator 8 acting through regulating mechanism 16, while the gate mechanism of the turbine 3 is controlled by the same regulator 8 acting through regulating mechanism 17.

During the normal operation of the installation, the gates 19 are open and water from the penstock 18 is admitted to the intake flumes 9. The water passing through each of the flumes 9 enters the gates of the turbines 2, 3 and after delivering power to these turbines is discharged through the draft tubes 12, 13 into the tail race 15 through the common discharge flume 14. The entering water is given an initial swirl in the proper direction by means of walls 10, 11 which as above stated, are formed to direct the water properly in accordance with the rotation of the adjacent turbines.

Each of the inlet flumes 9 is of like construction and has therein two turbines 2, 3 and associated elements. The turbines within each of the flumes are both horizontally and vertically on opposite sides of the center line of the flume. This arrangement of the turbines produces minimum interference of the supply streams and insures a full supply of water to each of the turbines. It will be noted that by locating the turbines at different levels, substantially two independent superposed inlet streams are produced and interference of the streams flowing to each turbine, is avoided. By arranging the turbines with their axes of rotation on opposite sides of a vertical plane passing the center-line of the flume 9, the water is guided between the turbine axes and an isodirectional flow of water is secured between the oppositely rotating runners. The location of the turbines as disclosed, also permits discharge of the water from the draft tubes 12, 13 with minimum interference of the out-flowing streams. This arrangement, besides being simple, is compact, thereby permitting installation of the greatest number of units within a given area.

It should be understood that it is not desired to be limited to the exact details of construction herein shown and described, for various modifications within the scope of the appended claims may occur to a person skilled in the art.

It is claimed and desired to secure by Letters Patent:

1. In combination, two oppositely rotatable turbines having non-coincident central planes perpendicular to their axes of rotation, and a common inlet flume for supplying fluid to said turbines in parallel.

2. In combination, two oppositely rotatable turbines having parallel axes of rotation, the central turbine planes perpendicular to said axes being spaced apart, and a common inlet flume for said turbines.

3. In combination, two oppositely rotatable turbines having parallel vertical axes of rotation, the central horizontal turbine planes being non-coincident, and a common open inlet flume for said turbines.

4. In combination, two oppositely rotatable turbines having non-coincident central planes perpendicular to their axes of rotation, and a draft tube for each of said turbines, said draft tubes being of substantially equal vertical lengths.

5. In combination, two oppositely rotatable vertical turbines, one of said turbines being located at a higher level than the other, and a common intake flume for supplying fluid to said turbines in parallel.

6. In combination, two oppositely rotatable vertical turbines, one of said turbines being located at a higher level than the other, and a draft tube for each of said turbines, said draft tubes being of substantially equal vertical lengths.

7. In combination, two oppositely rotatable turbines having non-coincident central planes perpendicular to their axes of rotation, a common inlet flume for said turbines, and a draft tube for each of said turbines, said draft tubes being of substantially equal vertical lengths.

8. In combination, two oppositely rotatable vertical turbines having non-coincident central horizontal planes, a common inlet flume for said turbines, and a draft tube for each of said turbines, said draft tubes being of substantially equal vertical lengths.

9. In combination, two single turbines rotatable about different axes and having non-coincident central planes perpendicular to said axes, and a common inlet flume for said turbines.

10. In combination, two turbines rotatable about different axes, a generator direct connected to each of said turbines, a common inlet flume for guiding fluid between said axes, and a speed governor common to said turbines.

11. In combination, two single turbines rotatable about different axes, said turbines having non-coincident central planes perpendicular to said axes, and a common inlet flume for guiding fluid between said axes.

12. In combination, two oppositely rotatable vertical turbines having parallel axes of rotation, said turbines having non-coincident central horizontal planes, a common open inlet flume for guiding fluid between said axes, and a draft tube for each of said turbines, said draft tubes being of substantially equal vertical lengths.

13. In combination, two oppositely rotatable single vertical Francis turbines having parallel axes of rotation, one of said turbines being located at a higher level than the other, and a common inlet flume for said turbines.

14. In combination, two oppositely rotatable single vertical Francis turbines, the downstream turbine being located at a higher level than the upstream turbine, and a common inlet flume for said turbines.

15. In combination, an inlet flume, and two single turbines within said flume, said turbines being both horizontally and vertically on opposite sides of the center line of said flume.

16. In combination, an open inlet flume, and two oppositely rotatable vertical turbines within said flume, said turbines being both horizontally and vertically on opposite sides of the center line of said flume.

In testimony whereof, the signature of the inventor is affixed hereto.

ARNOLD PFAU.